United States Patent [19]

Dempsey

[11] Patent Number: 5,008,540
[45] Date of Patent: Apr. 16, 1991

[54] ELECTRET GAMMA/X-RAY LOW LEVEL DOSIMETER

[75] Inventor: John C. Dempsey, Frederick, Md.

[73] Assignee: Rad Elec Inc., Frederick, Md.

[21] Appl. No.: 387,497

[22] Filed: Jul. 31, 1989

Related U.S. Application Data

[63] Continuation-in-part of Ser. No. 936,240, Dec. 1, 1986, Pat. No. 4,853,536.

[51] Int. Cl.⁵ .............................................. G01T 1/14
[52] U.S. Cl. ................................. 250/336.1; 250/374
[58] Field of Search .............................. 250/336.1, 374

[56] References Cited

U.S. PATENT DOCUMENTS

2,695,363 11/1954 Marvin ................................. 250/374

Primary Examiner—Carolyn E. Fields
Attorney, Agent, or Firm—Cushman, Darby & Cushman

[57] ABSTRACT

A small enclosed ion chamber with an electrostatically charged electret attached to the inner chamber wall. Positive or negative ions (depending on the polarity of the electret charge) formed in the chamber air by the passing of gamma radiation or X-rays move to and collect on the electret surface by virtue of its electrostatic attraction to ions of opposite polarity. These ions neutralize the ions of opposite polarity on the electret and cause a measurable reduction in its surface voltage which reduction is proportional to the dose of gamma and/or X-ray incidence on the chamber. The reduction of the electret surface voltage is used to calculate the dose of gamma or X-ray radiation incident upon the chamber during a known exposure period. In the preferred embodiment, filtered holes in the chamber permit radon to diffuse out of the ion chamber. A sealed outer container containing an absorbent such as activated charcoal surrounds the inner ion chamber to remove any radon captured within the container and to prevent any ambient radon from entering the ion chamber. Removal of this radon removes its undesirable contribution to the gamma/X-ray dose signal and thereby enhances the accuracy of the monitor.

37 Claims, 6 Drawing Sheets

ELECTRET GAMMA/X-RAY LOW LEVEL DOSIMETER

This is a continuation-in-part of Ser. No. 06/936,240, filed Dec. 1, 1986, now U.S. Pat. No. 4,853,536.

BACKGROUND OF THE INVENTION

The present invention provides simple, effective and accurate cumulative measurement of gamma radiation. It can provide the value of gamma radiation to be used for calculation of radioactive gas concentrations. It can also provide a tissue equivalent dosage measurement of gamma radiation.

Measurements of radioactive gas are important for many purposes. Tritium concentrations in potentially exposed workers are measured, for example, with periodic urine specimens. Carbon-14 serves as a useful research tool for monitoring the progress of many chemical and biological reactions and interactions. For example, many microorganisms break down carbon-14 containing compounds in sugar to produce carbon-14 dioxide gas which can be collected and measured to determine various characteristics of the microorganisms. Both tritium and carbon-14 dioxide produce low energy radiation which cannot be easily measured by conventional radioactivity detectors. In measurement of radioactive gas concentration, the background level of high energy gamma radiation must be subtracted from the measured reading.

Radon (Rn-222) and thoron (Rn-220) are radioactive gases which are formed in the uranium and thorium decay series. They decay by alpha emissions with a half-life of 3.8 days and 55.4 seconds respectively. When they are formed near the surface of uranium containing materials such as soil or rock, they can diffuse out into the surrounding air where they and their daughter products can pose a radiological hazard to man under certain conditions. Each time a radon (Rn-222) atom decays, its daughter products, polonium-218 (Po-218), lead-214 (Pb-214), bismuth-214 (Bi-214), polonium-214 (Po-214), decay in sequence with half lives of 3.05 minutes, 26.8 minutes, 19.7 minutes, 0.16 milliseconds, respectively. The Po-218 and Po-214 are more hazardous than their radon gas parent because they emit very energetic alpha particles and they are particulates and can deposit in lungs when breathed. Once in the lungs, their high energy alpha emissions can damage tissue and may cause cancer. Thoron (Radon-228) which decays in a similar manner, is harmful to a lesser degree.

Radon and associated daughter products have long been known to be a causative agent for lung cancer when present in high concentrations usually found in uranium mines. More recently, concern has been expressed by many scientists over the high radon concentrations that have been measured in poorly ventilated homes all across the country. Hazardous radon concentrations often build up in homes, especially in "tightly" constructed energy-efficient homes and in those which have been retrofit sealed to conserve energy. The U.S. Environmental Protection Agency has estimated that 5,000–20,000 lung cancer deaths will occur annually in the United States as a consequence of this radon buildup in homes. The resulting concern over this hazard has given rise to a need for a low cost, passive instrument for measuring the concentrations of these natural radioactive gases. Similar health hazards are associated with breathing other radioactive gases such as tritium or carbon-14 dioxide in and around nuclear facilities.

Integrating-type monitors which measure the average concentrations of radon or other radioactive gases over a few days, weeks or months are especially useful because wide short-term fluctuations in concentration often occur due to perturbations in ventilation and atmospheric conditions. The present invention meets all of these needs. When used as a radon and/or thoron monitor, it is simple, small and rugged enough to be mailed to homeowners and back to the laboratory for readout. This eliminates the cost of technicians travelling to and from the homes to perform the monitoring. A miniature version can be worn to monitor workers for radon, thoron or tritium exposure. In another embodiment, it serves to monitor the very small quantities of tritium and carbon-14 dioxide emitted from biologically active cultures in certain measurements and experiments.

Several scientists have described various types of passive environmental radon monitors (PERMS) in recent years. However, only a few of them, e.g., A. C. George (Ref 1: A Passive Environmental Radon Monitor; Radon Workshop --Feb. 1977, HASL-325; 1977 p. 25) and C. CostaRiberio, et al. (Ref. 2: A Radon Detector Suitable for Personnel or Area Monitoring, Health Physics Vol, 17, 1969), utilized a thin metal plate maintained at a high negative voltage to collect the positively charged decay products of radon to gain increased measurement efficiency and accuracy. This enhanced accuracy is especially needed for the home monitoring application where radon concentrations are normally low. All of these workers took advantage of the fact that the radon daughter products are positively charged when formed. The alpha radiation emitted by the daughter products is measured either by thermoluminescent dosimeters or by alpha track detectors and the results are used to calculate the radon concentration.

The collection plates and the measuring detectors in these earlier devices were located inside filtered passive diffusion chambers which prevented the radon daughter products already present in outside air from reaching the detector. Only the parent radon gas can pass through the filter by passive diffusion to enter the measuring chamber. In these earlier devices, the radon gas which diffused into the chamber was indirectly monitored by measuring the radiation from the daughter products which are formed inside the chamber after they were collected on the surface of the collectors. They did not measure the parent radon gas directly. Radioactive gases such as C-14 dioxide and tritium do not form charged particulate daughter products. Therefore, the earlier inventions cited will not measure these gases. The present invention, however, will measure any radioactive gas because their radioactive emissions always generate ions in the chamber air. Further, the present invention uses an electret as a sensor which is different from the detectors used by earlier devices.

Kotrappa et al. (Ref. 3: Electret - A New Tool for Measuring Concentrations of Radon and Thoron in Air) also experimented with electrets for indirect monitoring of radon or thoron. They used negatively charged electret as a collector in the place of metal sheet maintained at a high negative voltage. They also measured alpha radiation of collected daughter products by scintillation detectors or by other known detectors.

In addition, they made an incidental measurement of charge on the polycarbonate sheet covered electret as a requirement of the experiments to ensure sufficient charge on the polycarbonate sheet to collect the daughter products. The difference in surface charge of the polycarbonate sheet before and after the experiment was not used for measurement of radon. However, they found a rather poor correlation between the difference in charge on the polycarbonate sheet (electret itself was not measured) to the cumulative gradon exposure and suggested further work.

There are two reasons why that earlier device gave a very poor correlation with radon exposure as follows: (1) The polycarbonate foil used by Kotrappa, et al. had a much higher electrical conductivity than the electret material which was fluorocarbon polymer. This conductivity caused the ions which collected on the polycarbonate foil to bleed off to ground much more readily than they do from the electret. (2) The adhesive tape and the air gap between the polycarbonate foil and the electret caused by the adhesive tape in the Kotrappa device also perturbed the ion collection and retention capability of the electret assembly substantially.

All of these factors contributed to the very poor correlation between radon exposure and surface voltage in the Kotrappa device and rendered it unsuitable for radon monitoring.

In another paper, Kotrappa et al. (Reference 4: Measurement of Potential Alpha Energy Concentration of Radon and Thoron Daughters Using an Electret Dosimeter, Rad. Prot. Dos. Vol. 5, No. 1 of p. 49–56 - 1983) measured the voltage difference on an electret to quantify the amount of alpha energy expended in air by radon and thoron daughter products which were captured on a filter. The system did not measure radon gas. The device developed by Kotrappa et al. in Ref. 4 also embodies a pump to transport the radon daughter products into the chamber.

A need exists for small compact rugged devices which are capable of accurately and dependably measuring radiological gases and integrating the measurements over known times.

H. B. Marvin (Reference 5: U.S. Pat. No. 2,695,363; Method and Apparatus for Measuring Ionizing Radiations, issued Nov. 23, 1954) used an electret to collect and store ions. The chamber in this earlier invention was sealed to prevent air entry so it measured only the gamma radiation which penetrated through the chamber wall.

Figure 1:
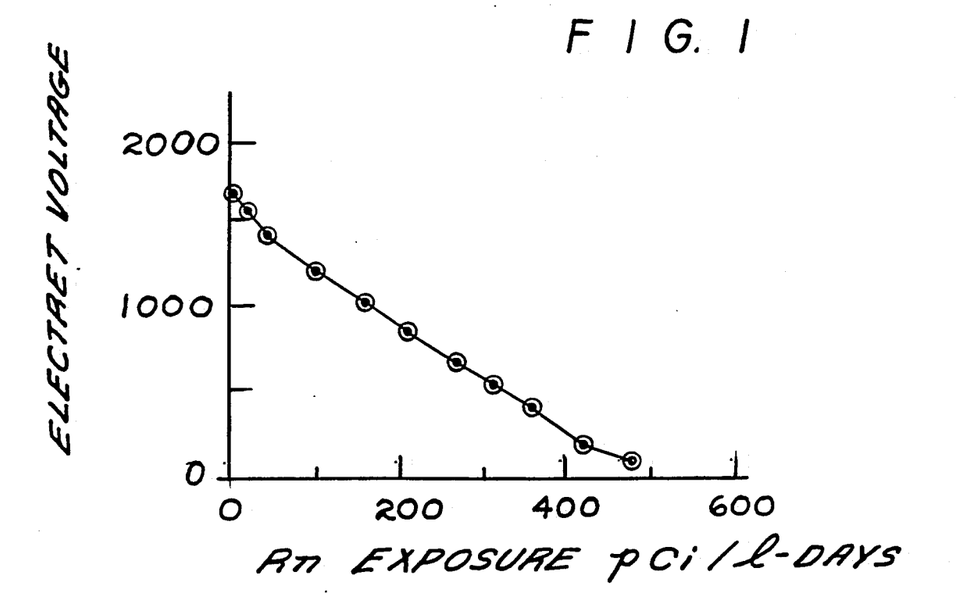
FIG. 1 is a plot of a calibration curve showing the response of the preferred environment of the invention to various amounts of radon.

This correlation between electret voltage and radon exposure using the present invention (i.e., with no adhesive tape or polycarbonate film), is excellent and it serves as a very accurate radon monitor. FIG. 1 shows this correlation using the present invention with a 225 ml cup-shaped chamber and 2.3 mm thick electret made of FEP Teflon.

The present invention also differs from devices which used real-time detectors (i.e., devices connected to real-time electronic readout systems). The present invention uses, instead, an electret type detector which records and integrates the positive or negative ions generated by the radon and radon daughter radiations without the need for connections to electronic devices during the radon exposure period. Real-time electronic equipment is too expensive and unwieldy for large scale home monitoring use.

Some monitoring devices are too large and heavy for home use because of the high voltage batteries or power supply utilized to maintain the charge on the detectors. Instead of batteries, the present invention uses a small precharged electret as described above. The electret ion-collection approach enables an accurate monitoring device which is small and rugged enough to be sent to homeowners through the mail. The use of a simple electret itself as a sensor rather than a solid state detector reduces the cost of the monitor and its readout equipment substantially.

SUMMARY OF THE INVENTION

An electret ion chamber (EIC) includes a small enclosed volume with an electrostatically charged electret attached to the inner chamber wall. The EIC is contained inside a sealable outer container. Gamma rays or X-rays which penetrate the EIC ionize the air in the chamber. The ions move to the electret surface and reduce its voltage. The amount of voltage reduction is a measure of the amount of Gamma and X-rays penetrating the EIC.

In one embodiment, a sorbent material, such as activated charcoal, occupies the space between the EIC and the outer container. Filtered holes in the EIC permit radon to diffuse out of the EIC into the outer container. The charcoal traps radon which has diffused out of the EIC and prevents radon outside the container from penetrating to the EIC. Reduction of radon within the EIC reduces the number of ions which would otherwise be produced in the chamber by radon decay and which would otherwise interfere with measurement of ions produced by Gamma and X-Rays. Reducing radon inside the EIC thus improves accuracy of Gamma and X-Ray measurement.

In an alternate embodiment, the EIC is completely sealed within a radon-proof outer container. Undesirable radon captured inside the outer container prior to sealing is eliminated by its own natural radioactive decay. Alternatively, the container may be purged by various means prior to sealing. The outer container may be immersed in a liquid, such as water, to form a radon-proof seal.

The EIC and outer container may be made of low-Z (low atomic weight) materials which allow measurement of very low energy gamma photons as well as high energy ones. The EIC and outer container may be made of material having the same Z value as human tissue, which results in a tissue-equivalent dose measurement.

The EIC is made of electrically conductive material, or it has an electrically conducive surface to bleed away static charge. The EIC may be made of plastic filled with particulate or fibrous carbon to provide conductivity and to maintain a low Z value.

DETAILED DESCRIPTION OF THE PREFERRED EMBODIMENT

Figure 2:
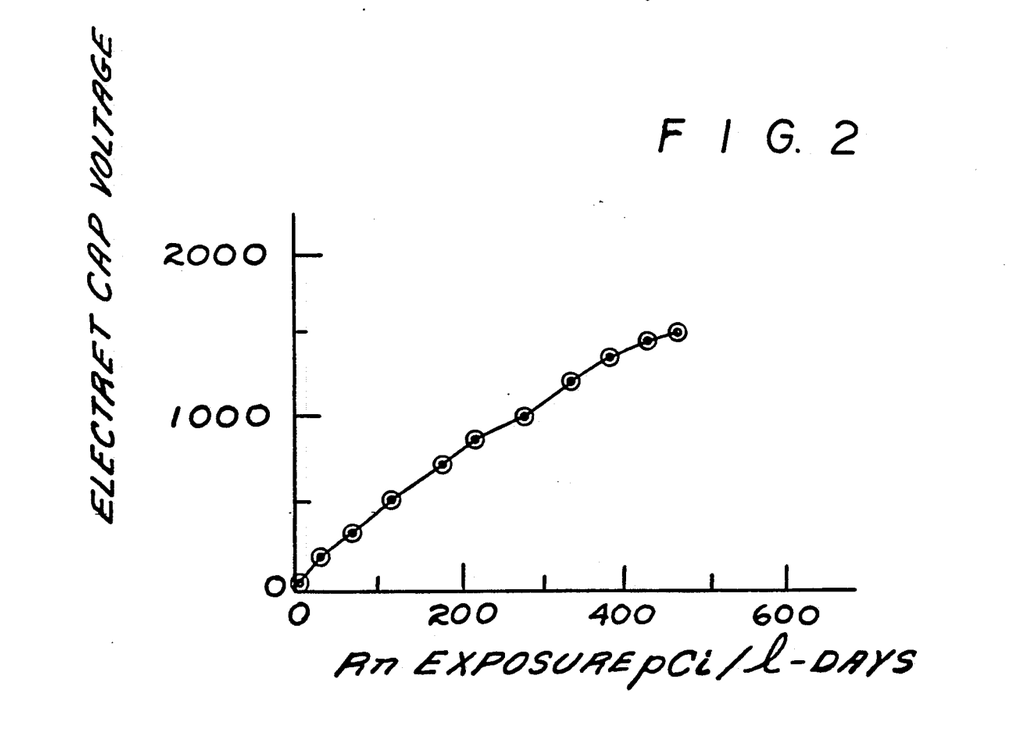
FIG. 2 is a plot of a calibration curve showing the response of the alternative embodiment of the invention to various amounts of radon.

FIGS. 1 and 2 were described earlier.

Figure 3:
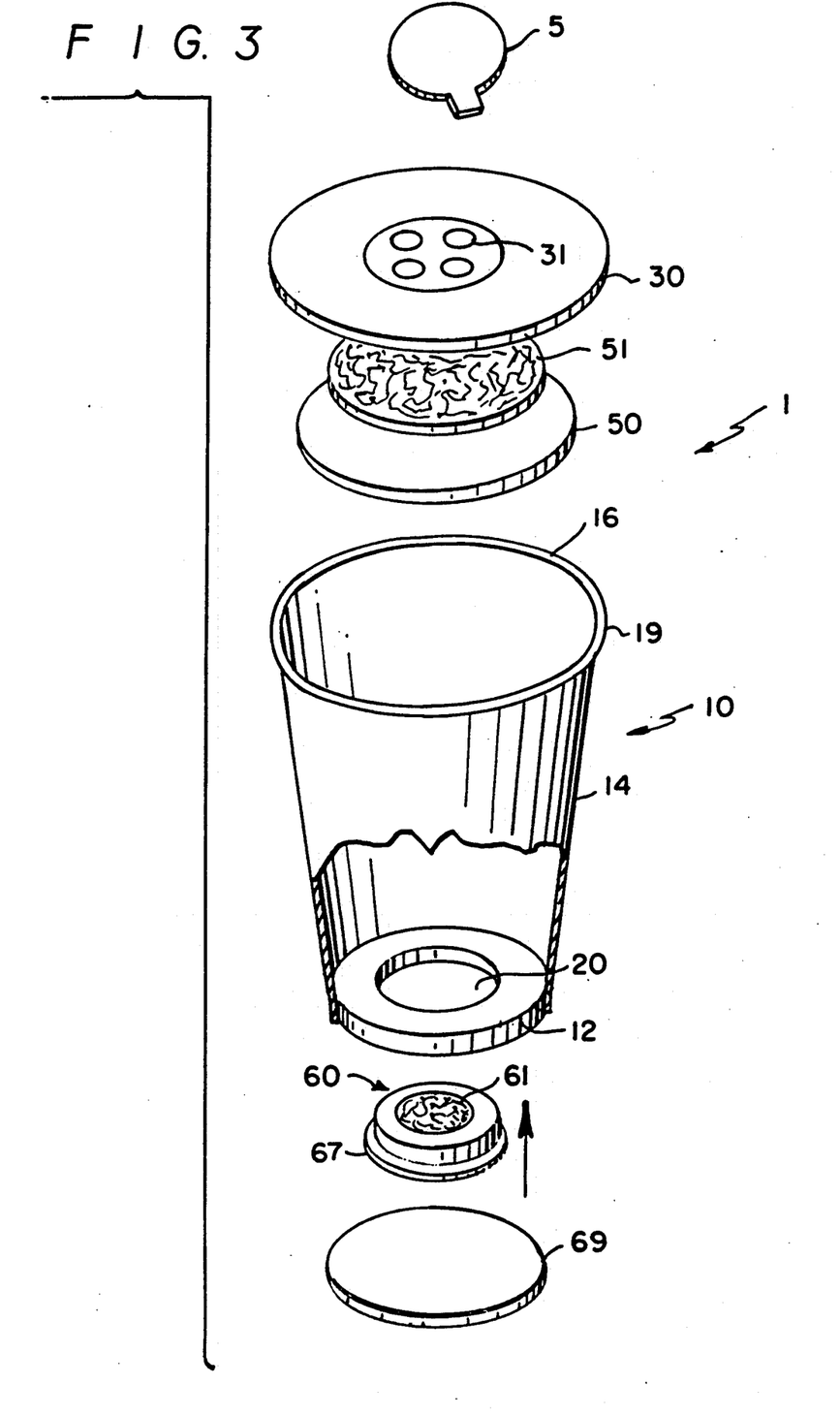
FIG. 3 is a sectional elevation of the preferred embodiment of an ionization chamber for monitoring radon constructed according to the present invention.

The basic components of the preferred embodiment of the ionization chamber for monitoring radioactive gases shown in FIG. 3 are the cup-shaped chamber 10, a porous, removable cover assembly 30 and a removable electret assembly 60 fixed to the bottom surface 12 of the chamber 10. The monitor includes a removable adhesive tape seal 5 which adheres to the top of the cover 30 to seal the monitor against radon entry before and after its exposure to the environment to be measured. Cup 10 has a circular disk-shaped bottom 12. A truncated cone-shaped side wall 14 extends upward from the periphery of the disk-shaped bottom 12 and terminates upwardly in a large, open, upper edge 16.

A rounded ledge 19 around the inner perimeter of the cup 14 slightly below the upper edge 16 serves as a seat and a seal for the cover 30. A friction fit or an appropriate adhesive or an adhesive tape around the edge 16 serves to hold the cover 30 on the ledge 19 when the monitor 1 is assembled.

The cover 30 contains a hole or group of holes 31 near its center to permit gases to enter. A filter 50 and a membrane 51 are fixed over the holes 31 on the bottom of the cover 30 with an appropriate adhesive bond. Filter 50 removes particles, ions and radon daughter products from the ambient gas that passes in and out of the chamber 10 through the holes 31 in the cover 30. The membrane 51 serves to exclude thoron gas from entering by delaying its diffusion until it all decays (is half life is only 55.6 sec.).

Holes 31 through the cover 30 permit radon to diffuse through the filter 50 and into the chamber 10 continuously while excluding all outside dust, ions and charged radon daughter atoms.

The charged electret 61 attracts and captures any ions of opposite polarity formed in the chamber 10 by the nuclear emissions of the decaying radon and radon daughter products. The chamber 10 can be made of any rigid material which is impermeable to radon, such as metal or plastic, but its inner surface must be electrically conductive to conduct away to ground any electrostatic charged caused by ions which attach to it during monitoring. The cover 30 can be made of any rigid material such as plastic or metal, but its inner surface must also be electrically conductive.

An electret assembly 60 is fixed in the center of the inside surface of the chamber bottom 12.

The top portion of the cylindrical electret assembly 60 fits tightly into hole 20 through the bottom 12 of chamber 10 but the bottom ring 67 will not pass through the hole 20 because it is larger in diameter than the hole 20. Accordingly, it seals against the chamber bottom 12.

Figure 3A:
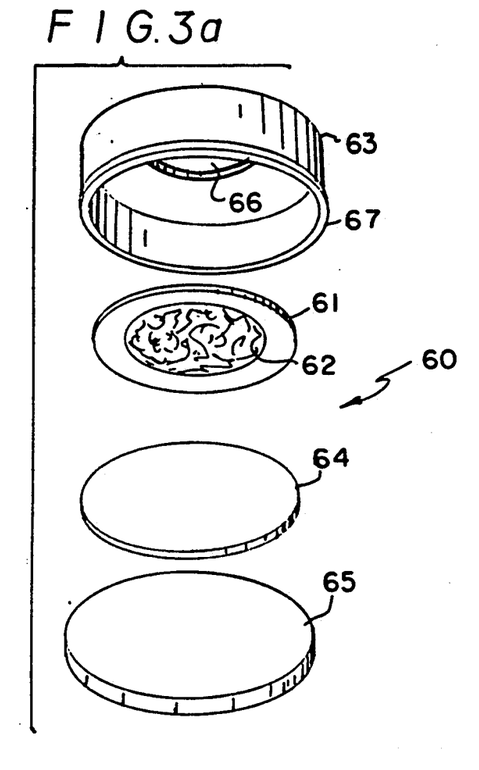
FIG. 3a is an exploded sectional elevation of the electret assembly in the preferred embodiment.

The electret assembly 60 is held in place by a cardboard disk 69 which is forced into the bottom of the chamber 10 so as to hold the assembly ring 67 firmly against the chamber bottom 12. The cardboard disk 69 can be removed to remove the assembly 60. FIG. 3a is a sectional elevation of this electret assembly. The bottom of the electret 61 is covered with an electrically conductive metallic backing 62. This backing 62 is electrically connected to the surface of the electret protector cup 63 by a metal foil 64 held in place by the friction fitted retainer disk 65, which is usually made of cardboard.

The electret protector cup 63 has a hole 66 in its top which exposes the electret 61 and permits its electrostatic field to emanate into the chamber 10. The electret assembly 60 can be removed from the chamber 10 for measurement by mechanically breaking the adhesive bond between the retainer disk 65 and the chamber bottom 12.

The preferred shape of the electret 61, which is permanently electrostatically charged, is a disk, as shown.

Figure 3B:
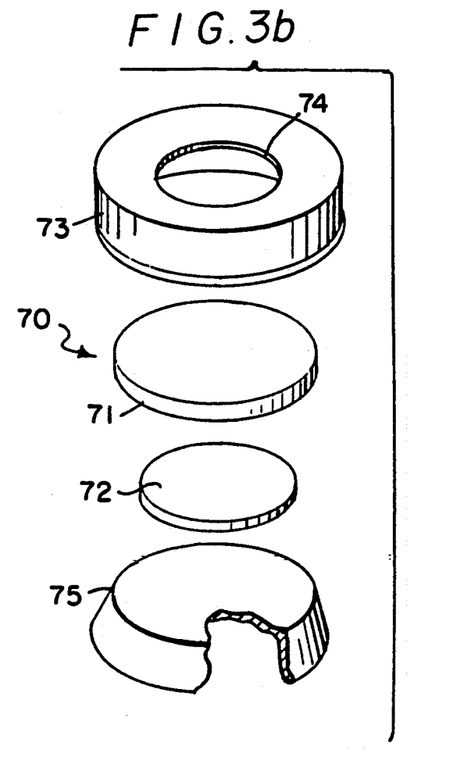
FIG. 3b is an exploded sectional elevation of an alternative capped electret assembly embodiment which can be substituted for the electret assembly shown in FIG. 3.

FIG. 3b is a sectional elevation of an alternative electret and cap assemblies 70 which embodies a cap 71 held above or in contact with the electret 72 by a cap holder 73. The cap 71 is suspended across the hole 74 in the cap holder 73 by adhesive bonding attachment to the cap holder 73. The cap 71 is made of a fluorocarbon polymer having a high electrical resistivity so the ions which accumulate on its surface do not bleed off to ground. The electret 72 is bonded to the bottom of the electret holder 75 which fits inside of the cap holder 7 to bring the electret 72 into contact with the cap 71. The electret 72 and cap 71 can be held in contact by bonding applied between the electret holder 75 and the cap holder 73.

Figure 4:
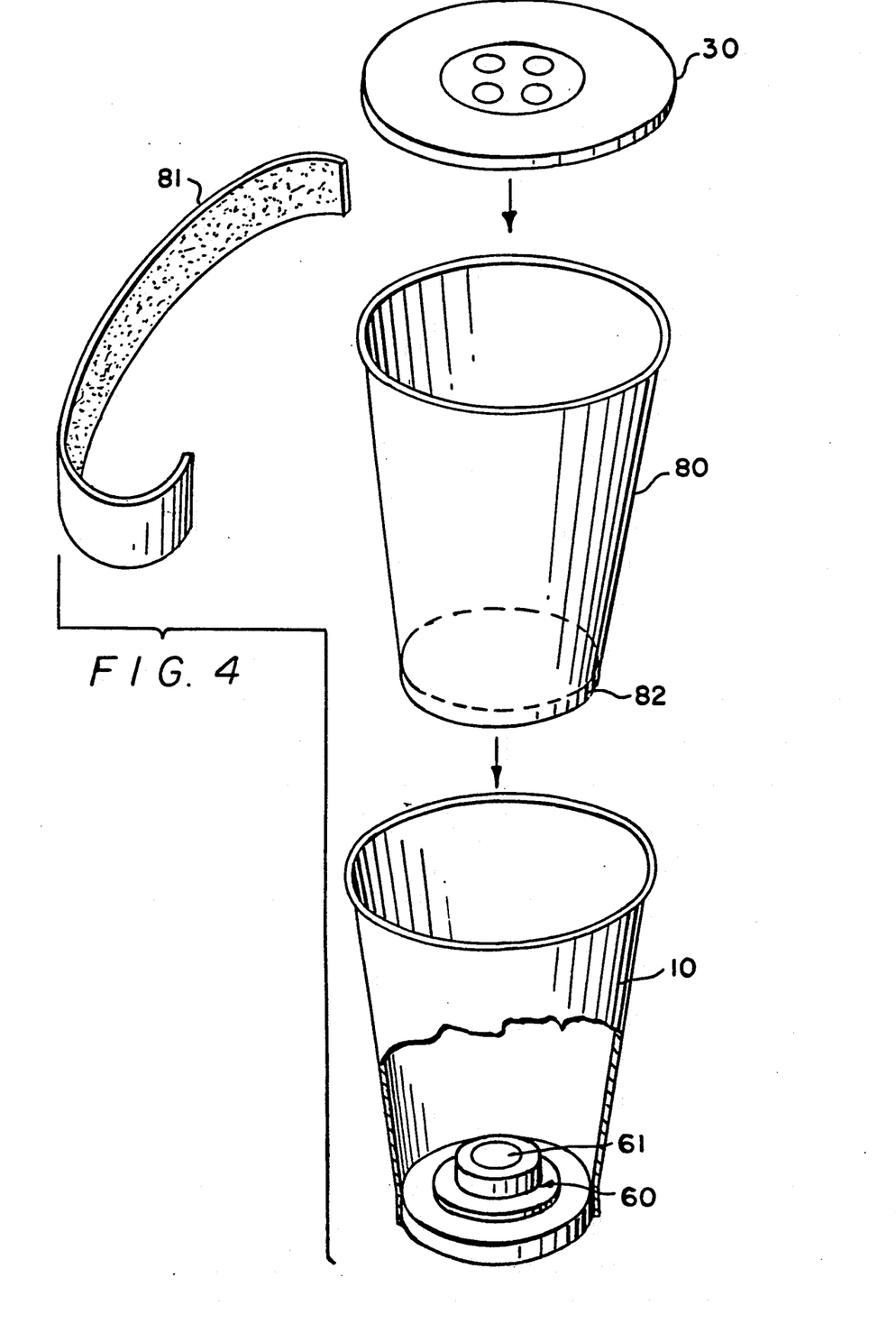
FIG. 4 is a sectional elevation of an alternate embodiment of an ionization chamber for monitoring radon constructed according to the present invention which has features which reduce the contribution of background gamma radiation to the radon signal.

FIG. 4 shows an optional cup-in-cup embodiment which can be used with either embodiment of the invention to improve their radon measuring accuracy. This inner chamber or cup 80 is of the same shape as the chamber 10 in the preferred embodiment shown in FIG. 3 and it fits inside of the chamber 10 in FIGS. 3 and 4. Either embodiment of the invention will function without this inner cup 80 but it serves to improve the accuracy of the radon measurement. Prior to storage and shipment, the inner cup 80 is slipped inside the radon monitoring chamber 10. The tight fitting cover 30 containing the filter 30 is then placed on the inner cup 80 and adhesive tape 81 is applied between the two components to hold them together and to prevent radon entry into the volume remaining in the false bottom 82 during storage and shipment. The entire inner surface of the false volume 82 is lined with a conductive material to prevent the electrostatic field from the electret 61 from entering inner cup 80.

It can be seen that the inner cup 80 purges the air and radon from the ionization chamber 10 as it is shoved into place inside the chamber 10. The inner cup 80 has a false bottom 82 which straddles the electret assembly 60 or 70 with- out touching it when the inner cup 80 is in place inside the chamber 10 With the radon and air thus substantially removed from the radon chamber 10, ions are prevented from forming and collecting on the electret 61 or electret cap 71 (depending on the embodiment used). Thus the inner cup 80 effectively stops the radon monitoring process in the invention when it is in place inside the chamber 10. The same inner cup 80 eliminates all unwanted ionization generated by the background gamma radiation which penetrates the chamber 10. This improves the accuracy of the invention because background radiation is known to vary from place to place.

Figure 3C:
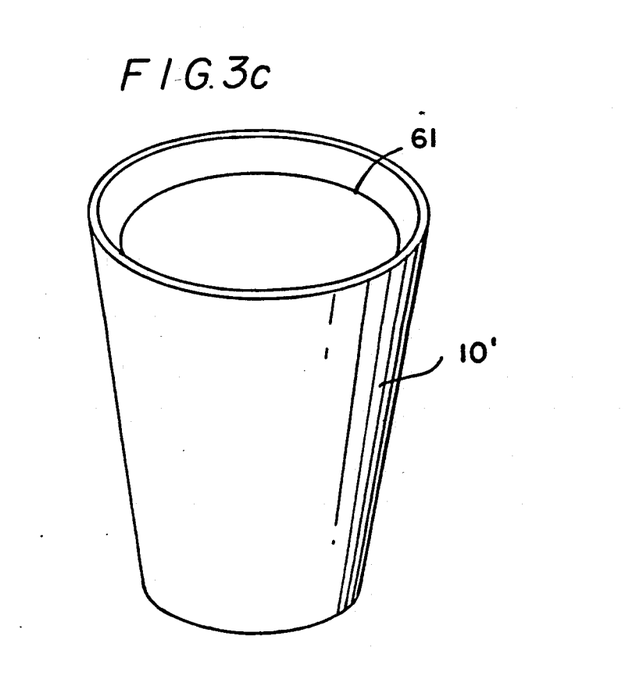
FIG. 3c is a view of an alternate embodiment showing a positively charged electrode fixed into the inside surface of the chamber.

FIG. 3c shows a positively charged electret 61' fixed to the inside surface of the chamber 10'. The positively charged electret 61' forms a second electret which lies in a spaced apart relation from the first electret 61. The second electret comprises substantially the inner surface of the chamber.

Electret ion chambers (EICS) as described above have been shown to be excellent instruments for measuring penetrating radiation, i.e., gamma rays and x-rays. When penetrating radiation passes through an EIC, it ionizes the air in the EIC chamber and ions thus formed move to the electret surface and reduce the voltage on the electret. The amount of voltage reduction on the electret during a known exposure period, as determined by measuring the change in the surface voltage of the electret, is a measure of the amount of radiation which penetrated the chamber.

However, until now, EICs have not been suitable for measuring low levels of penetrating radiation because any radon gas which diffuses inside the EI also generates ions and these radon ions interfere with the signal from the penetrating radiation. There is no way to distinguish between the ions generated by the penetrating radiation from outside the EIC and those generated by a radioactive gas inside. Thus, in order to use an EIC to measure low levels of penetrating radiation accurately it is necessary that the EIC chamber be completely devoid of any radon during the measurement. It is very difficult to exclude radon from the EIC because radon gas is ubiquitous in nature. Radon readily diffuses through most ordinary seals such as gaskets and o-rings which can be used to seal the opening in the EIC through which the electret must be inserted and removed. A permanent seal around the opening (e.g., one made by soldering or welding) is not suitable because the seal must be broken every time the electret is removed for voltage measurement and replaced in the EIC to effect a radiation measurement.

The invention comprises a simple and inexpensive method of preventing this radon interference in an EIC measurement of penetrating radiation. It does this in the preferred embodiment by placing filtered holes in the EIC wall, by enclosing the EIC in a sealable outer container, and by including a sorbent such as activated charcoal in the space between the EIC and the outer container. The activated charcoal in the space between the EIC and outer container serves to absorb all of the radon out of the air which was trapped inside the outer container during assembly including that which was trapped inside the EIC itself. The activated charcoal does this by a well known absorption process called gettering. The radon trapped in the EIC itself is gettered out by the activated charcoal through the filtered holes provided in the EIC wall. The activated charcoal also getters any additional radon which may diffuse into the outer container after it is sealed.

Figure 5:
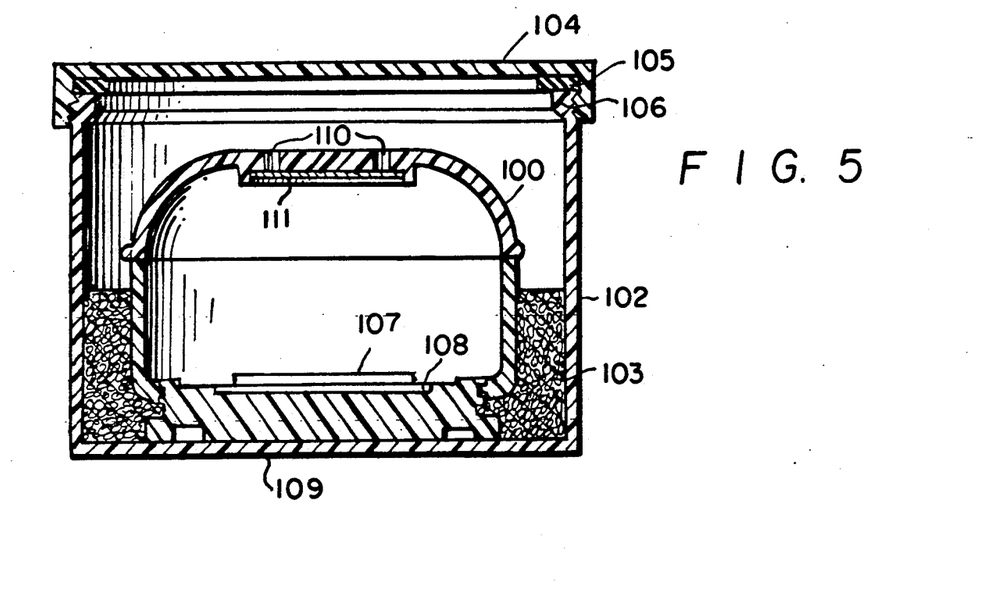
FIG. 5 is a cross-sectional view of a preferred embodiment of the present gamma monitor.

FIG. 5 shows a sectional view of a preferred embodiment. As seen in FIG. 5 an EIC 100 is contained inside a sealable outer container 102 and all or part of the space between the EIC and the outer container is filled with a radon sorbent 103 such as activated charcoal or a radon free liquid such as water. If a liquid seal is used the EIC must be sealed to exclude the liquid, e.g. placed in a sealed plastic bag, such as a "zip lock" bag. The outer container 102 has a lid 104 which is closed tightly to effect a seal by compressing a compression gasket 105 or other sealing means between the lid 104 and the upper rim of the container 106. The sorbent 103 in the space between the EIC 100 and the sealed outer container 102 can be either in open granular form or packaged in a suitable permeable bag, box or canister for more convenient handling.

The EIC 100 in the preferred embodiment contains an electret 107 mounted in a threaded electret assembly 108 which can be screwed in and out of a receptacle 109 in the EIC. The holes 110 in the EIC and the filter 111 which covers the holes provide a pathway through which the radon is gettered out of the EIC by the sorbent 103 after lid 104 is sealed on the outer container 102. The filter 111 prevents particles from entering the EIC.

The components of the invention can be made out of most metals or plastics, but the EIC material itself, or at least its surface, must be electrically conductive. However, if all of the components are made of low-Z (i.e., low atomic weight) plastic, the invention has an important additional application in that it can then measure the very low energy gamma photons as well as the high energy photons which penetrate its chamber. When all of these low energy gamma photons are included in a gamma measurement, the result is known as an air equivalent gamma measurement. Moreover, if the materials which comprise the walls of the EIC chamber have the same Z value as human tissue, a gamma or x-ray measurement made with such an instrument will yield a tissue equivalent dose measurement. This is important because such tissue equivalent dose measurements give the actual radiation dose which humans and other animals would receive under the same exposure conditions.

The preferred embodiment of the invention makes such tissue equivalent measurements because all of its components are made of a tissue equivalent low-Z plastic material. The activated charcoal between the two containers is mostly carbon which is also a tissue equivalent material.

The low-Z plastic material used for fabricating EICs must also be slightly electrically conductive or at least have a slightly conductive surface in order to bleed any static charge away (usually to ground) before it builds up to interfere with the normal operation of the EIC. This electrical conductivity is usually attained in the plastic by filling it with particulate or fibrous carbon. This carbon additive is preferred rather than metal additives because it is a low-Z material and, as such, retains the desirable tissue equivalent characteristics in the plastic. A low-Z metal such as aluminum or a carbon filled plastic such as polypropylene, polyethylene, polystyrene, or ABS are examples of suitable electrically conductive low-Z materials which can be used for making the components of the preferred embodiment.

Thus, the preferred embodiment is an EIC made of low-Z conductive plastic sealed within an outer container also made of low-Z plastic and with activated charcoal in the space between the outer container and the EIC. Since all of the materials in this preferred embodiment, which the radiation must penetrate to reach the inner sensitive volume of the ECI, are tissue equivalent low-Z materials, it yields an accurate tissue equivalent gamma radiation dose measurement.

When electret ion chambers are used for measuring radon, natural background gamma radiation, which varies in intensity and energy from place to place, is an interferant. That is, because EICs are sensitive to gamma radiation, radon measurements made with EIC's must be corrected for the amount of natural background gamma radiation which is included in their radon signal. Since the invention is not exposed to radon, it can be used to measure and correct for this natural background gamma radiation. To accomplish this, the invention is exposed at the same location where the EIC radon measurement is made. The background gamma radiation as measured with the invention is deducted from the apparent radon measurement obtained with the radon measuring EIC to determine true radon concentration value (after both values are converted to equivalent units). Thus, the capability of the invention to measure natural background radiation is important in itself and in its value for correcting low concentration radon measurements made with similar EICS.

Figure 6:
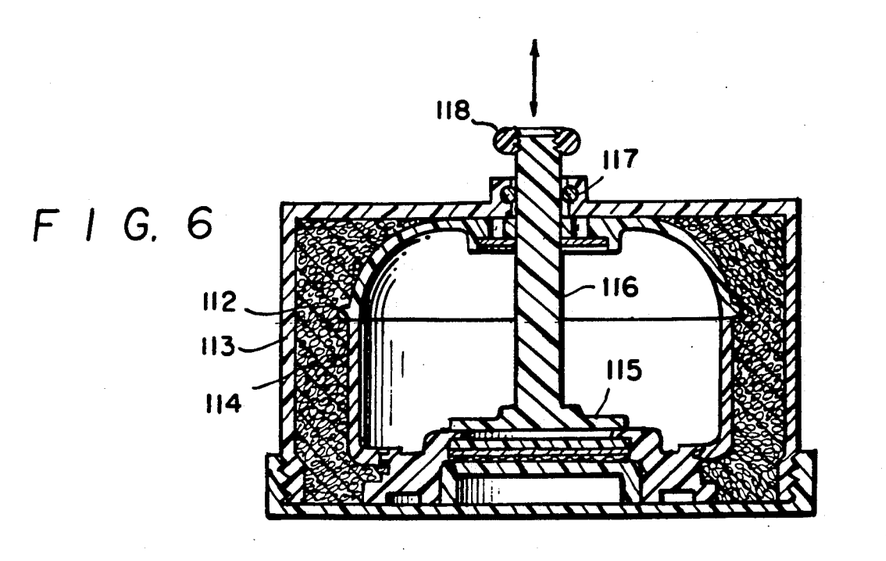
FIG. 6 is a cross-sectional view of an alternative embodiment of the present invention.

The embodiment of the invention, shown in FIG. 6, permits the EIC to be turned on and off at will without opening the outer container. This embodiment enables the user to easily control the duration of the gamma or x-ray measurement. Also, this embodiment can be stored or shipped for extended periods (weeks or months) in the off position and then turned on to initiate a gamma or x-ray measurement. In this second embodiment, provision is made to cover and uncover the electret sensor in the EIC at will from outside the sealed outer container after the charcoal has been introduced into the space between the EIC and the outer container and after the system is completely assembled. This is accomplished by providing a removable cover for the electret. This cover prevents ions from reaching the electret so the EIC is off when it is down close to the electret. However, this electret cover cannot touch the electret surface itself because it will cause the surface to lose some or all of its electric charge if it touches it directly. When the electret cover is down, the initial electret voltage, as measured before the EIC system is assembled, will remain unchanged for many months. This embodiment incorporates a mechanism which enables the electret cover to be raised up away from the electret at any time so as to initiate a measurement of penetrating radiation. The same electret cover mechanism can then be lowered to cover the electret again to terminate the measurement. This on-off capability permits the EIC embodiment shown in FIG. 6 to be shipped to distant location in the off position, turned on and off again at that location to effect a known exposure to penetrating radiation, and then returned to the point of origin where the final voltage of the electret can be read out in order to quantify the radiation dose received by the invention.

Several configurations are possible for the embodiment of FIG. 6 which enables remotely covering and uncovering of the electret in the EIC after the EIC has been sealed in its outer container and with the activated charcoal in place between the EIC and the outer container.

As seen in FIG. 6, the embodiment consists essentially of an EIC 112, an outer container 113 and a sorbent 114 between them. However this embodiment incorporates a disk shaped electret cover 115 slightly larger in diameter than the electret itself. This cover 115 can be lowered and raised to cover and uncover the electret at will by lowering and raising a vertical stem 116 having a knob 118 which is attached to the cover 115. The electret cover stem 116 penetrates up through the EIC wall 112, through the sorbent 114 and through the top of the outer container 113. An o-ring or similar sealing mechanism 117 is provided between the stem 116 and the outer container 113 to minimize leakage of radon into the sorbent 114. This arrangement of components permits the stem 116 and thus the electret cover 115 to be raised and lowered from outside the outer container 113. It is essential that this electret cover 115 and stem 116 also be fabricated from an electrically conductive material or one which has an electrically conductive surface so as to avoid buildup of electrostatic charge on these surfaces. Other material of construction can be the same as described above for the first embodiment shown in FIG. 5.

It can be seen in FIG. 6 that EIC can be completely assembled with the electret cover fixed down over the electret. Since no ions can reach the electret with the electret cover down like this, the electret voltage will remain exactly the same until the cover is deliberately lifted to initiate a gamma radiation measurement. Raising the portion of the stem of the electret cover that is accessible on the outside of the outer container raises the electret cover inside the EIC thereby initiating ion collection by the electret, i.e., raising the cover turns the EIC on. Since all radon trapped inside during assembly and any radon which subsequently leaks into the outer container is gettered by the activated charcoal, the ions which the electret collects inside the EIC chamber are generated only by the gamma or x-radiation which penetrates through the EIC walls from outside i.e., there are no radon generated ions to add to the ions generated by the penetrating radiation. When the predetermined exposure time for radiation measurement is up, the lid can be pushed back down close to the electret surface to turn the EIC off, thus terminating the penetrating radiation measurement.

Figure 7:
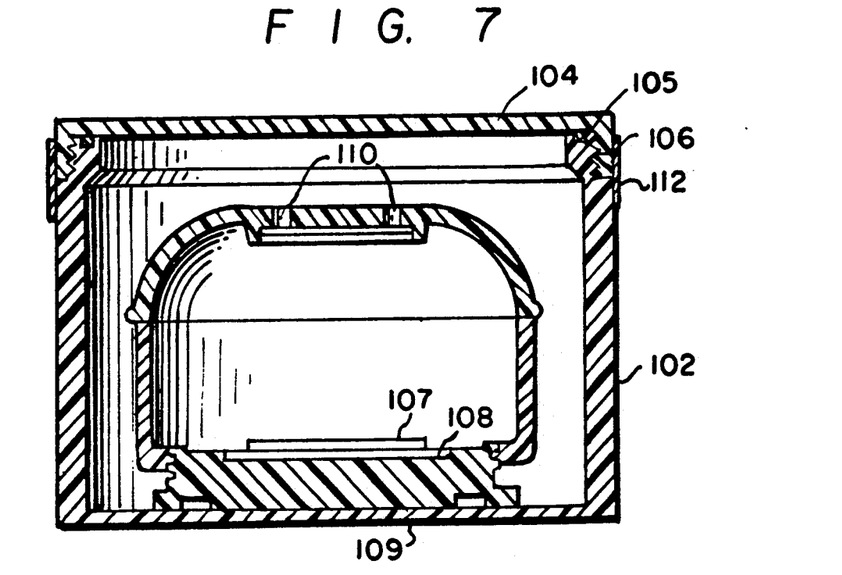
FIG. 7 is a sectional view of an alternative embodiment of the present invention.
Figure 8:
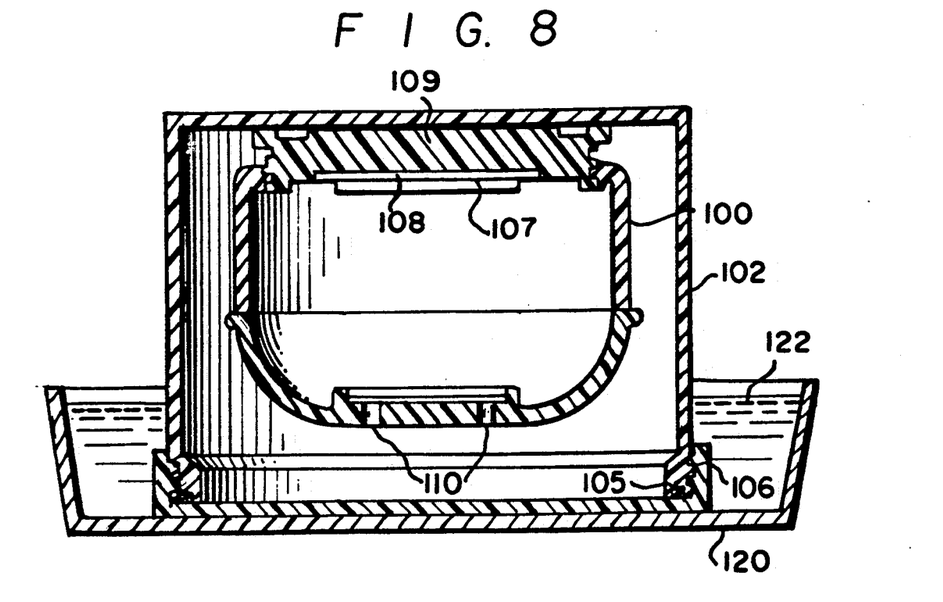
FIG. 8 is a sectional view of the present invention sealed in water.

Another embodiment of the invention is shown in FIG. 7 which does not require an adsorbent to remove the undesirable ambient radon which is captured inside the outer container during assembly. As shown in FIG. 7, this embodiment consists of an electret ion chamber completely sealed within a radon-proof outer container. The outer container is sealed by both an inner compression seal 105 and an external seal of tape 112 or other suitable sealant. This outer seal can be a liquid seal as shown in FIG. 8, where the covered container 102 is immersed in a pan 120 which is filled with a liquid 122 such as water. The level of the liquid is such that it covers the joint between the cover 104 and the container 102. In this embodiment, the undesirable radon captured inside the outer container is eliminated by its own natural radioactive decay. Since its radioactive half-life is only 3.84 days, the captured radon only contributes its undesirable background signal for about one week before it has essentially decayed away. The amount of this undesirable radon signal can be minimized by assembling both the ion chamber and the outer container in an environment where the radon concentration is very low. In practice, the total period of exposure of the embodiment of FIG. 7 to the gamma radiation being measured is always made sufficiently long to render the relatively small radon background signal an insignificant portion of the overall gamma radiation signal. This is effectively accomplished by exposing the dosimeter for time periods which are long compared to the half-life of radon-222. It is obvious that the undesirable radon inside the outer chamber can also be purged by various means prior to sealing the containers. Such methods including flushing with radon depleted air, nitrogen, carbon dioxide, etc.

What has been described is a small rugged economical low level gamma/X-ray dosimeter which excludes background radiation signals. The invention is not to be limited to what has been disclosed but to the spirit and scope of the appended claims.

What is claimed:

1. An apparatus for monitoring gamma or X-ray radiation comprising a chamber having an inner surface which is electrically conductive, an electret positioned within the chamber for holding an electrostatic charge which collects ions formed in the chamber by bombardment of gamma or X-ray radiation, and a removable means connected with the chamber for mounting the electret, said chamber enclosed in a radioactive gas tight container.

2. The apparatus of claim 1 wherein the radioactive gas tight container includes a sorbent material.

3. The apparatus of claim 2 wherein the sorbent material is activated charcoal.

4. The apparatus of claim 1 wherein the container is placed in a liquid to exclude radioactive gases from the chamber.

5. An apparatus for monitoring gamma or X-ray radiation comprising a chamber having an inner surface which is electrically conductive, an electret positioned within the chamber for holding an electrostatic charge which collects ions formed in the chamber by bombardment of gamma or X-ray radiation, and a removable means connected with the chamber for mounting the electret and means for reducing the volume of gas exposed to the electret when the chamber is not in use, said chamber enclosed in an radioactive gas tight container.

6. The apparatus of claim 5 wherein the radioactive tight container includes a sorbent material.

7. The apparatus of claim 6 wherein the sorbent material is activated charcoal.

8. The apparatus of claim 5 wherein the container is placed in a liquid to exclude radioactive gases from the chamber.

9. A method of monitoring gamma or X-ray radiation, said method comprising using a ion chamber having electrically conductive surfaces such that an enclosed electric field associated with an enclosed electret attracts charged ions formed in the chamber by ionization of the gas within the chamber to the surface of a positively or negatively charged electret mounted within the chamber and neutralizing the electret such that the electret surface charge changes in proportion to the number of gamma or X-ray bombardments of the chamber, said chamber surrounded by a container thereby preventing radon entry into said chamber.

10. The method of claim 9 including placing a sorbent material within the container.

11. The method of claim 10 wherein the sorbent material is activated charcoal.

12. The method of claim 9 including the steps of flushing the chamber and container with a radon-free gas.

13. The method of claim 12 wherein the radon-free gas is aged air.

14. A tissue equivalent dosimeter for measuring low level gamma or X-ray radiation comprising an electret ion chamber formed of a low "Z" material, and an electret charged to a measurable voltage level removably mounted in the chamber, the chamber enclosed by a radon tight container formed of a low "Z" material.

15. The dosimeter of claim 14 wherein the container includes a sorbent material.

16. The dosimeter of claim 15 wherein the sorbent material is activated charcoal.

17. The dosimeter of claim 15 wherein the container is immersed in a liquid to exclude radon.

18. The dosimeter of claim 17 wherein the liquid is water.

19. The dosimeter of claim 14 wherein the chamber contains a means for reducing the volume of the gas exposed to the electret when the chamber is not in use.

20. An apparatus for monitoring gamma or X-ray radiation comprising a chamber having an inner surface which is electrically conductive, an electret positioned within the chamber for holding an electrostatic charge which collects ions formed in the chamber by bombardment of gamma or X-ray radiation, said chamber enclosed in a radioactive-gas-tight container with a sorbent material.

21. The apparatus of claim 20 wherein the sorbent material is activated charcoal.

22. The apparatus of claim 20 wherein the chamber includes a removable means for mounting the electret.

23. The apparatus of claim 20 wherein the container is placed in a liquid to exclude radioactive gases from the chamber.

24. An apparatus for monitoring gamma or X-ray radiation comprising a chamber having an inner surface which is electrically conductive, an electret positioned within the chamber for holding an electrostatic charge which collects ions formed in the chamber by bombardment of gamma or X-ray radiation, and means for reducing the volume of gas exposed to the electret when the chamber is not in use, said chamber enclosed in an radioactive-gas-tight container with a sorbent material.

25. The apparatus of claim 24 wherein the sorbent material is activated charcoal.

26. The apparatus of claim 24 wherein the chamber includes a removable means for mounting the electret.

27. The apparatus of claim 24 wherein the container is placed in a liquid to exclude radioactive gases from the chamber.

28. A method of monitoring gamma or X-ray radiation, said method comprising:
using a ion chamber having electrically conductive surfaces such that an enclosed electric field associated with an enclosed electret attracts charged ions formed by ionization of gas within the chamber by gamma or X-rays;
enclosing said chamber and a sorbent material within a radioactive-gas-tight container thereby preventing radon entry into said chamber;
exposing said ion chamber such that ions formed within the chamber neutralize the electret surface charge in an amount proportional to the number of gamma or X-ray bombardments of the chamber.

29. The method of claim 28 wherein the sorbent material is activated charcoal.

30. A method of monitoring gamma or X-ray radiation, said method comprising:
using an ion chamber having electrically conductive surfaces such that an enclosed electric field associated with an enclosed electret attracts charged ions formed by ionization of gas within the chamber by gamma or X-rays;

enclosing said chamber within a radioactive-gas-tight container;

flushing the chamber and container with a radon-free gas;

sealing the container, thereby preventing radon entry into said chamber;

exposing said ion chamber such that ions formed within the chamber neutralize the electret surface charge in an amount proportional to the number of gamma or X-ray bombardments of the chamber.

31. The method of claim 30 wherein the radon-free gas is aged air.

32. A tissue equivalent dosimeter for measuring low level gamma or X-ray radiation comprising an electret ion chamber formed of a low "Z" material, an electret charged to a measurable voltage level mounted in the chamber, and a sorbent material, the chamber and sorbent material enclosed by a radioactive-gas-tight container formed of a low "Z" material.

33. The dosimeter of claim 32 wherein the sorbent material is activated charcoal.

34. The dosimeter of claim 32 wherein the electret is removably mounted in the chamber.

35. The dosimeter of claim 32 wherein the container is immersed in a liquid to exclude radon.

36. The dosimeter of claim 32 wherein the liquid is water.

37. The dosimeter of claim 32 wherein the chamber contains a means for reducing the volume of the gas exposed to the electret when the chamber is not in use.

* * * * *